(12) United States Patent
Iwase et al.

(10) Patent No.: US 12,485,888 B2
(45) Date of Patent: Dec. 2, 2025

(54) TRAVEL CONTROL APPARATUS FOR VEHICLE

(71) Applicant: SUBARU CORPORATION, Tokyo (JP)

(72) Inventors: Takuya Iwase, Tokyo (JP); Kazuaki Ueda, Tokyo (JP); Shingo Ugajin, Tokyo (JP); Toshihiro Hayashi, Tokyo (JP); Kazuo Nomoto, Tokyo (JP); Hiroto Kobayashi, Tokyo (JP); Takumi Funabashi, Tokyo (JP); Kenta Someya, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 174 days.

(21) Appl. No.: 18/225,757

(22) Filed: Jul. 25, 2023

(65) Prior Publication Data
US 2024/0042999 A1 Feb. 8, 2024

(30) Foreign Application Priority Data

Aug. 4, 2022 (JP) .................. 2022-125016

(51) Int. Cl.
B60W 30/095 (2012.01)
B60W 50/06 (2006.01)
G06V 20/58 (2022.01)

(52) U.S. Cl.
CPC .......... *B60W 30/095* (2013.01); *B60W 50/06* (2013.01); *G06V 20/58* (2022.01); *B60W 2530/10* (2013.01); *B60W 2554/00* (2020.02)

(58) Field of Classification Search
CPC .............. B60W 30/095; B60W 50/06; B60W 2530/10; B60W 2554/00;
(Continued)

(56) References Cited

U.S. PATENT DOCUMENTS 5,948,035 A * 9/1999 Tomita .................... B60T 8/172
701/79
7,805,321 B2 * 9/2010 Wahlbin ................. G06Q 40/08
705/2
(Continued)

FOREIGN PATENT DOCUMENTS

JP 2010-195177 A 9/2010
JP 2019-64301 A 4/2019
JP 2019-209910 A 12/2019

Primary Examiner — Fadey S. Jabr
Assistant Examiner — Faris Asim Shaikh
(74) Attorney, Agent, or Firm — TROUTMAN PEPPER LOCKE LLP

(57) ABSTRACT

A travel control apparatus for a vehicle includes a surrounding environment recognition device, a collision time calculator, a collision object estimator, and an after-collision travel range estimator. The surrounding environment recognition device includes a recognizer configured to recognize a surrounding environment of the vehicle, and a collision object recognizer configured to recognize an object that has a possibility to come into collision with the vehicle in the recognized surrounding environment. The collision time calculator is configured to calculate a predicted time to the collision between the vehicle and the object. The collision object estimator is configured to, based on the predicted time to the collision, estimate a travel route of the object and a collision position on the vehicle where the object collides with the vehicle. The after-collision travel range estimator is configured to estimate a travel range of the vehicle after the collision based on the estimated collision position.

18 Claims, 6 Drawing Sheets

(58) Field of Classification Search
CPC ... B60W 2554/404; B60W 2554/4042; B60W 2554/805; B60W 2554/806; B60W 30/0953; B60W 30/0956; B60W 50/0097; B60W 30/08; B60W 2030/082; B60W 30/085; B60W 60/0027; B60W 60/00272; G06V 20/58; G01C 21/3415; G01C 22/00; B60R 21/0136; B60R 2021/01308; G08G 1/166; G08G 1/16; G08G 1/096827; G08G 1/0125
See application file for complete search history.

(56) References Cited

U.S. PATENT DOCUMENTS

| | | | | |
|---|---|---|---|---|
| 2004/0103004 A1* | 5/2004 | Wahlbin | ................ | G06Q 40/08 705/1.1 |
| 2006/0282218 A1* | 12/2006 | Urai | ................ | B60W 30/095 340/436 |
| 2010/0214155 A1* | 8/2010 | Harada | ............... | B60R 21/0134 342/147 |
| 2014/0176714 A1* | 6/2014 | Li | ................ | G08G 1/166 348/148 |
| 2016/0144896 A1* | 5/2016 | Takahashi | ................ | B62D 6/00 701/41 |
| 2016/0297431 A1* | 10/2016 | Eigel | ............... | B60W 30/18109 |
| 2017/0282933 A1* | 10/2017 | Ohmi | ................ | B60R 21/207 |
| 2019/0031190 A1* | 1/2019 | Choi | ................ | B60W 10/10 |
| 2019/0077402 A1* | 3/2019 | Kim | ................ | B60W 30/143 |
| 2019/0315343 A1* | 10/2019 | Steffey | ................ | G05D 1/0257 |
| 2019/0329772 A1* | 10/2019 | Graves | ................ | B60W 30/16 |
| 2019/0375402 A1* | 12/2019 | Shimizu | ................ | B60W 10/04 |
| 2020/0191952 A1* | 6/2020 | Makinen | ................ | G01S 7/003 |
| 2021/0229702 A1* | 7/2021 | Tsuji | ................ | B60W 60/0016 |
| 2021/0316721 A1* | 10/2021 | Lim | ................ | B62D 15/0285 |
| 2021/0347355 A1* | 11/2021 | Laughlin | ............. | B60W 30/085 |
| 2023/0085098 A1* | 3/2023 | Staats | ............. | G08G 1/096741 701/117 |
| 2023/0211778 A1* | 7/2023 | Kim | ................ | G06V 10/82 701/301 |
| 2023/0322208 A1* | 10/2023 | Rojas | ................ | B60W 50/085 701/41 |
| 2024/0135813 A1* | 4/2024 | Cai | ................ | G08G 1/0145 |

* cited by examiner

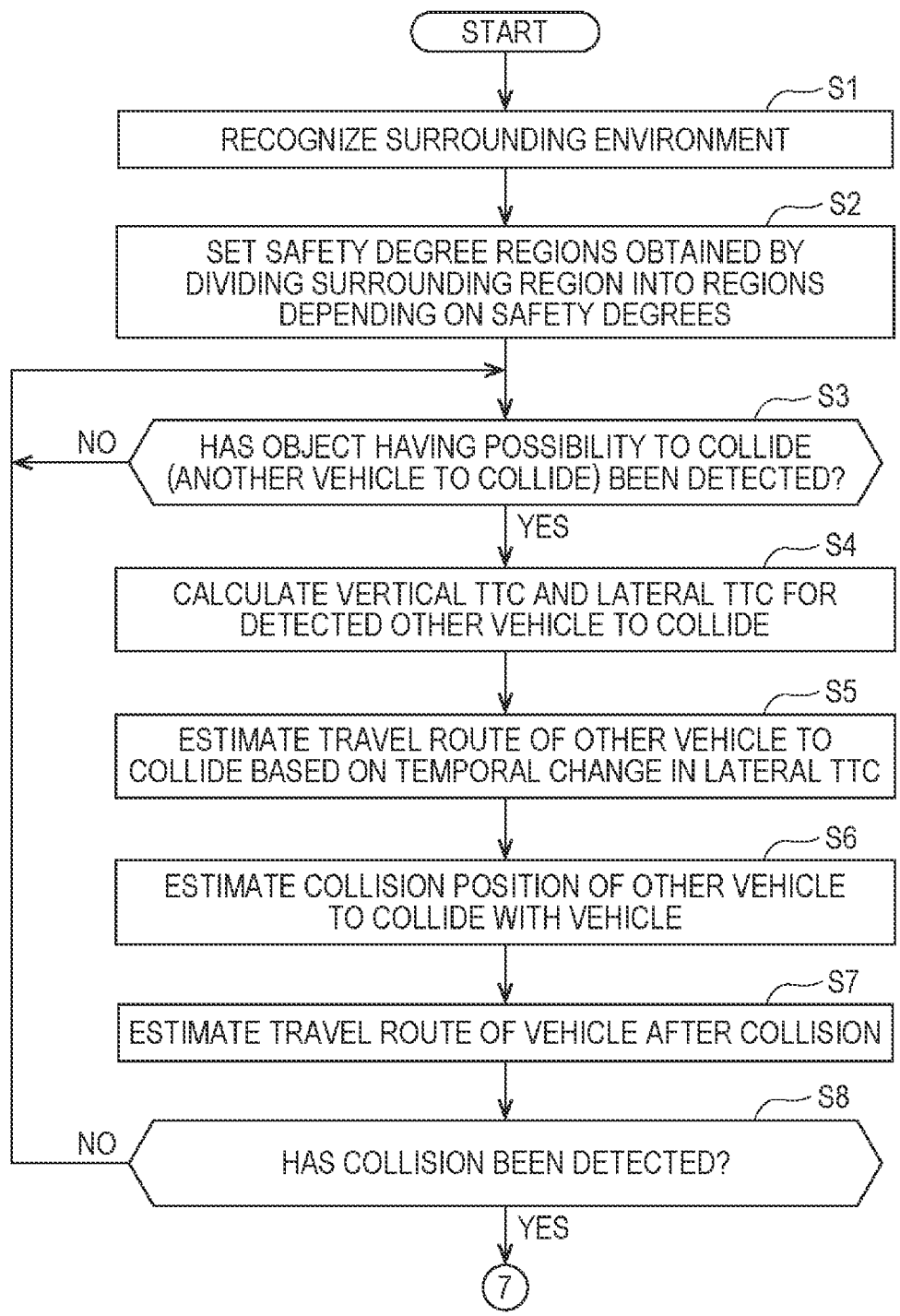

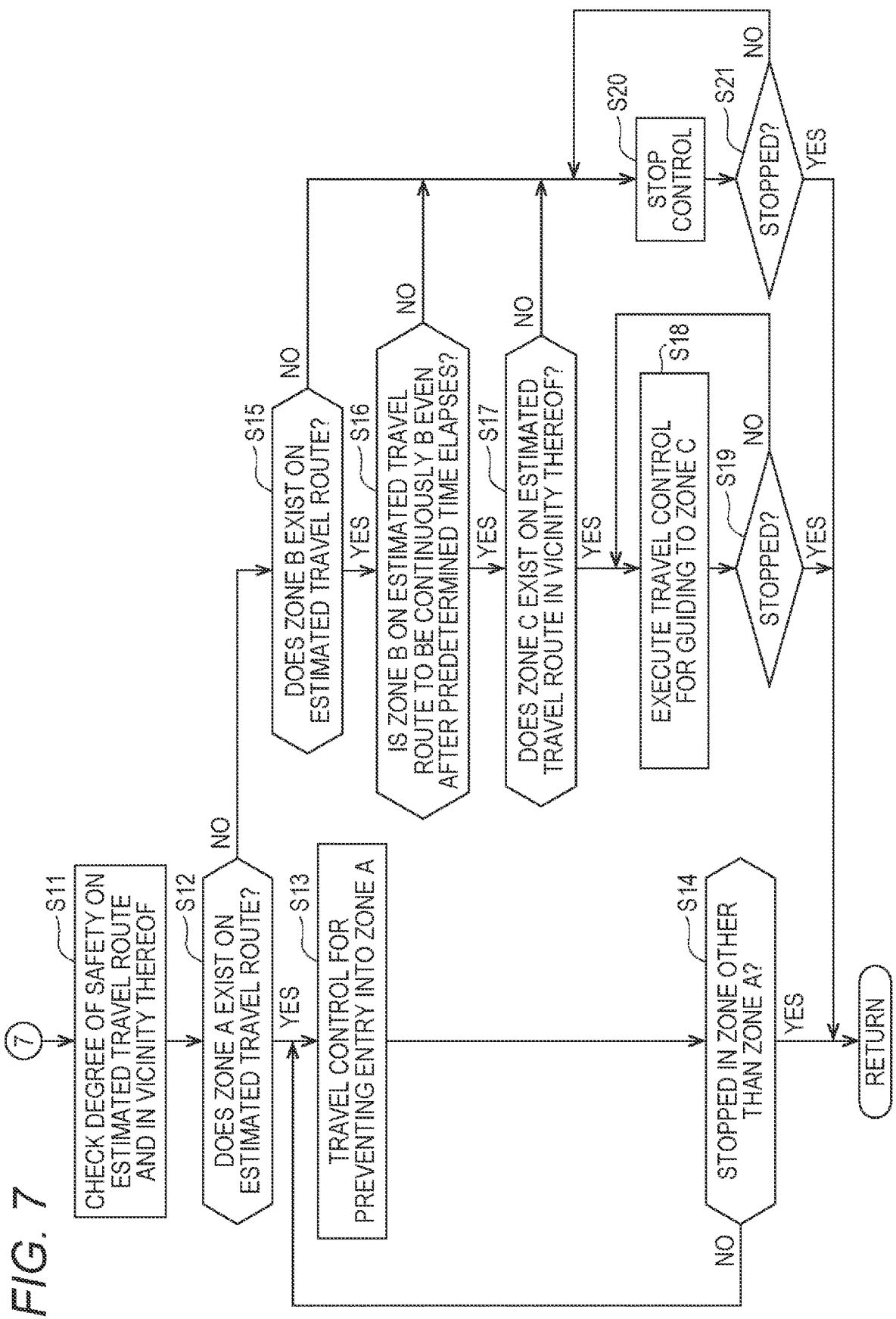

TRAVEL CONTROL APPARATUS FOR VEHICLE

CROSS-REFERENCE TO RELATED APPLICATION

The present application claims priority from Japanese Patent Application No. 2022-125016 filed on Aug. 4, 2022, the entire contents of which are hereby incorporated by reference.

BACKGROUND

The disclosure relates to a travel control apparatus for a vehicle that estimates a travel route of a vehicle after a primary collision.

In general, when a collision accident or the like occurs in a vehicle such as an automobile, there is a possibility that a travel route of the vehicle after the primary collision rapidly changes in a direction not intended by the driver who drives the vehicle.

Accordingly, with respect to a conventional travel control apparatus for a vehicle, there is a demand for a control technique for reducing third party damage or the like that may be caused by a secondary collision or the like when a vehicle collides with another vehicle by performing travel control of the vehicle after the primary collision or the like. For example, Japanese Unexamined Patent Application Publication (JP-A) No. 2010-195177, JP-A No. 2019-64301, JP-A No. 2019-209910, and the like have made various proposals regarding travel control at the time of collision of vehicles.

JP-A No. 2010-195177 and the like disclose a technique of detecting a moving body such as another vehicle using a sensor device such as a radar while the vehicle is traveling, and accurately estimating a collision position of the other vehicle with the vehicle in order to protect an occupant when a collision with the other vehicle detected is expected.

Further, a travel control apparatus for a vehicle disclosed in JP-A No. 2019-64301 and the like recognizes an object present around the vehicle (mainly ahead in the traveling direction) using various sensor devices, sets a priority for each recognized object, sets a travel route of the vehicle after the primary collision based on the set priority, and performs travel control of the vehicle along the set estimated travel route.

In a case where another vehicle approaching the vehicle is detected and it is predicted that the other vehicle will collide with the vehicle when the vehicle is in a situation such as being stopped, a travel control apparatus for a vehicle disclosed in JP-A No. 2019-209910 and the like estimates a moving direction of the vehicle after the primary collision, and performs travel control for avoiding or reducing the collision between the vehicle and an object present in the estimated moving direction.

SUMMARY

An aspect of the disclosure provides a travel control apparatus for a vehicle. The travel control apparatus includes a surrounding environment recognition device, a collision time calculator, a collision object estimator, and an after-collision travel range estimator. The surrounding environment recognition device includes a recognizer and a collision object recognizer. The recognizer is configured to recognize a surrounding environment of the vehicle. The collision object recognizer is configured to recognize an object that has a possibility to come into collision with the vehicle in the recognized surrounding environment of the vehicle. The collision time calculator is configured to calculate a predicted time to the collision between the vehicle and the object. The collision object estimator is configured to, based on the calculated predicted time to the collision, estimate a travel route of the object and a collision position on the vehicle where the object collides with the vehicle. The after-collision travel range estimator is configured to estimate a travel range of the vehicle after the collision based on the estimated collision position.

An aspect of the disclosure provides a travel control apparatus for a vehicle. The travel control apparatus includes a surrounding environment recognition device comprising a sensor and first circuitry, and circuitry. The surrounding environment recognition device is configured to recognize a surrounding environment of the vehicle. The second circuitry is configured to recognize an object that has a possibility to come into collision with the vehicle in the recognized surrounding environment of the vehicle. The second circuitry is configured to calculate a predicted time to the collision between the vehicle and the object. The second circuitry is configured to, based on the calculated predicted time to the collision, estimate a travel route of the object and a collision position on the vehicle where the object collides with the vehicle. The second circuitry is configured to estimate a travel range of the vehicle after the collision based on the estimated collision position.

BRIEF DESCRIPTION OF THE DRAWINGS

The accompanying drawings are included to provide a further understanding of the disclosure and are incorporated in and constitute a part of this specification. The drawings illustrate an embodiment and, together with the specification, serve to describe the principles of the disclosure.

FIG. 6 is a flowchart of a first half of travel control at the time of collision executed by the travel control apparatus of FIG. 1; and FIG. 7 is a flowchart of a second half of the travel control at the time of collision executed by the travel control apparatus of FIG. 1.

DETAILED DESCRIPTION

Figure 1:
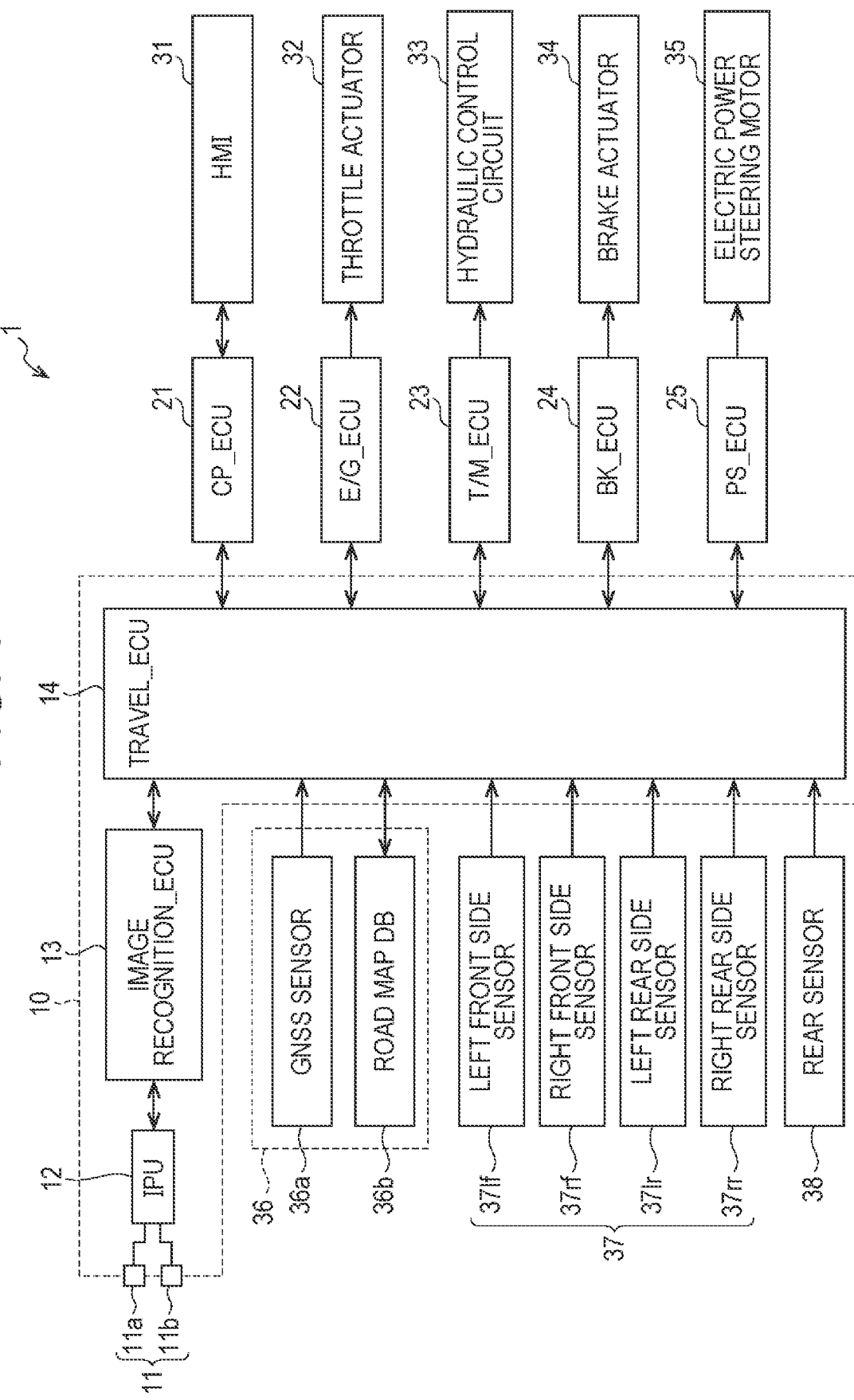
FIG. 1 is a block configuration diagram illustrating a schematic configuration of a travel control apparatus according to an embodiment of the disclosure.

Since the techniques disclosed in JP-A No. 2010-195177, JP-A No. 2019-64301, and the like calculate an accurate collision position and a travel route of a vehicle after a primary collision by performing complicated arithmetic processing, there is a problem that the cost of the arithmetic device increases, a long arithmetic time is taken, and thus quick response is insufficient.

Further, the travel control apparatus for the vehicle disclosed in JP-A No. 2019-209910 and the like described above mainly considers a situation where the vehicle is stopped or in a parking lot, and there is a problem that it is not possible to sufficiently cope with a situation during high-speed traveling such as traveling on a road.

It is desirable to provide a travel control apparatus for a vehicle capable of quickly estimating a travel route of a vehicle after a primary collision by an easier and simpler method without performing complicated arithmetic processing.

Hereinafter, the disclosure will be described with reference to the illustrated embodiments. Each drawing used in the following description is schematically illustrated, and dimensional relationships, scales, and the like of each member may be illustrated differently for each component in order to illustrate each component in a size that can be recognized on the drawing. Therefore, the disclosure is not limited only to the illustrated form with respect to the quantity of each component, the shape of each component, the ratio of the size of each component, the relative positional relationship of each component, and the like described in each drawing.

Note that, in describing the configuration and operation of the present embodiment, the road system is exemplified as a road system based on left-hand traffic in which the traffic division for vehicle is on the left side in the traveling direction. However, the configuration and operation of the present embodiment can be applied to a road system based on right-hand traffic in an exactly similar manner by switching the right and left and considering the same.

First, a schematic configuration of a travel control apparatus for a vehicle according to an embodiment of the disclosure will be described below with reference to FIG. 1. FIG. 1 is a block configuration diagram illustrating a schematic configuration of a travel control apparatus according to the embodiment of the disclosure.

As illustrated in FIG. 1, a basic configuration of a travel control apparatus 1 of the present embodiment has a configuration substantially similar to that of a conventional travel control apparatus of this type. Therefore, the following description will only schematically describe the travel control apparatus 1 of the present embodiment, and detailed description will be omitted.

The travel control apparatus 1 of the present embodiment includes a camera unit 10 that is an onboard camera device fixed to a front-side upper central portion in a cabin of a vehicle on which the travel control apparatus 1 is mounted (hereinafter referred to as the vehicle).

The camera unit 10 includes a stereo camera 11, an image processing unit (IPU) 12, an image recognition unit (image recognition_ECU) 13, and a travel control unit (travel_ECU) 14.

The stereo camera 11 is recognizes a surrounding environment of the vehicle. In one embodiment, the stereo camera 11 may serve a "recognizer". The stereo camera 11 includes a main camera 11a and a sub camera 11b. For example, the main camera 11a and the sub camera 11b are disposed forward (in the traveling direction) at symmetrical positions with respect to the center in a vehicle width direction in the cabin of the vehicle.

The main camera 11a and the sub camera 11b includes, for example, a CMOS image sensor or the like, and acquire two images from different viewpoints of the surrounding environment of a region in a predetermined range in front of the vehicle at predetermined imaging cycles synchronized with each other to generate a stereo image. The stereo image data thus generated is output to the IPU 12 as surrounding environment image data (image data representing the surrounding environment while the vehicle is traveling).

The IPU 12 receives the surrounding environment image data captured by the stereo camera 11, performs predetermined image processing on the received image data, and detects an edge of various objects such as an object (moving object or stationary object) displayed on the image and a lane dividing line indicated on a road surface (hereinafter simply referred to as a lane dividing line or the like). Thus, the IPU 12 recognizes objects, lane dividing lines, and the like around the vehicle. Then, the IPU 12 acquires distance information from a positional displacement amount of the corresponding edge on the left and right images, and generates image information (distance image information) including the distance information. The distance image information thus generated is output to the image recognition_ECU 13.

The image recognition_ECU 13 obtains a road curvature (1/m) of lane dividing lines that divide the left and right of the traveling road on which the vehicle travels (vehicle traveling road) and a width between the left and right lane dividing lines (lane width) based on the distance image information and the like received from the IPU 12. Various methods for obtaining the road curvature and the lane width are known. For example, the image recognition_ECU 13 recognizes the left and right lane dividing lines by binarizing the road curvature by a luminance difference based on surrounding environment information, and obtains the curvature of the left and right lane dividing lines for each predetermined section by a curve approximate expression by least square approximation, or the like. Furthermore, the image recognition_ECU 13 calculates the lane width from the difference in curvature between the left and right lane dividing lines.

Then, based on the curvature of the left and right lane dividing lines and the lane width, the image recognition_ECU 13 calculates a vehicle lateral position deviation or the like that is a distance from the center of the lane to the center of the vehicle in the vehicle width direction.

Further, the image recognition_ECU 13 performs predetermined pattern matching or the like on the distance image information, and recognizes a stationary object such as a guardrail or a curbstone extending along a road, or a three-dimensional object such as a moving object (mobile bodies including, for example, other oncoming vehicles, front right/left turning vehicles, other vehicles following in front, bicycles, pedestrians, and the like) moving in the periphery.

Here, in the recognition of the three-dimensional object in the image recognition_ECU 13, for example, the type of the three-dimensional object, the height of the three-dimensional object, the distance to the three-dimensional object, the speed of the three-dimensional object, the relative speed between the three-dimensional object and the vehicle, the relative distance between the three-dimensional objects (for example, a lateral distance between a curbstone or the like at a road edge and a lane dividing line or the like near the curbstone or the like), and the like are recognized. Furthermore, when the three-dimensional object is another vehicle, a rough vehicle type (type of large vehicle, medium vehicle, standard vehicle, light four-wheeled vehicle, two-wheeled vehicle, or the like), a vehicle size, and the like are also recognized.

Further, in this case, the image recognition_ECU 13 recognizes an object that has a possibility to collide with the vehicle among the recognized surrounding environment of the vehicle. In one embodiment, the image recognition_ECU 13 may serve as a "collision object recognizer". Here, examples of the object that has a possibility to collide with the vehicle include an oncoming vehicle, a front right/left turning vehicle, and the like. These objects are recognized as other vehicles to collide.

Further, the image recognition_ECU 13 sets safety degree regions corresponding to the safety degrees in a surrounding region of the vehicle. In this case, the image recognition_ECU 13 serves as a safety degree region setter. Note that details of the safety degree regions set by the safety degree region setter will be described later.

These various types of information recognized by the image recognition_ECU 13 are output to the travel_ECU 14 as first surrounding environment information.

As described above, in the travel control apparatus 1 of the present embodiment, the image recognition_ECU 13 recognizes the first surrounding environment around the vehicle together with the stereo camera 11 and the IPU 12. In one embodiment, the image recognition_ECU 13 may serve as a "surrounding environment recognition device" together with the stereo camera 11 and the IPU 12.

The travel_ECU 14 is a control unit for integrally controlling the travel control apparatus 1. As various control units, a cockpit control unit (CP_ECU) 21, an engine control unit (E/G_ECU) 22, a transmission control unit (T/M_ECU) 23, a brake control unit (BK_ECU) 24, a power steering control unit (PS_ECU) 25, and the like are coupled to the travel_ECU 14 via an in-vehicle communication line such as a controller area network (CAN).

Further, as various sensors, a locator unit 36, an onboard radar apparatus 37 (a left front side sensor 37lf, a right front side sensor 37rf, a left rear side sensor 37lr, and a right rear side sensor 37rr), a rear sensor 38, and the like are coupled to the travel_ECU 14.

A human machine interface (HMI) 31 disposed around the driver's seat is coupled to the CP_ECU 21. The HMI 31 includes, for example, a switch for instructing execution of various types of driving assistance control, a mode switching switch for switching a driving mode, a steering touch sensor for detecting a steering holding state of the driver who drives the vehicle, a driver monitoring system (DMS) for detecting face authentication, a line of sight, and the like of the driver, a touch panel display (display panel), a combination meter, a speaker, and the like.

Upon receiving a control signal from the travel_ECU 14, the CP_ECU 21 appropriately notifies the driver of various alarms for the preceding vehicle and the like, various types of information regarding the execution status of the driving assistance control, the surrounding environment of the vehicle, and the like by display, sound, and the like through the HMI 31. Further, the CP_ECU 21 outputs, to the travel_ECU 14, various types of input information such as an on/off operation state for the various types of driving assistance control input by the driver through the HMI 31.

A throttle actuator 32 of an electronically controlled throttle, or the like is coupled to an output side of the E/G_ECU 22. Further, various sensors such as an accelerator sensor that is not illustrated are coupled to an input side of the E/G_ECU 22.

The E/G_ECU 22 performs drive control on the throttle actuator 32 based on a control signal from the travel_ECU 14, a detection signal from the various sensors, or the like. Thus, the E/G_ECU 22 adjusts the intake air amount of the engine and generates a desired engine output. Further, the E/G_ECU 22 outputs signals of an accelerator opening and the like detected by the various sensors to the travel_ECU 14.

A hydraulic control circuit 33 is coupled to an output side of the T/M_ECU 23. Further, various sensors such as a shift position sensor that is not illustrated are coupled to an input side of the T/M_ECU 23. The T/M_ECU 23 performs hydraulic pressure control on the hydraulic control circuit 33 based on an engine torque signal estimated by the E/G_ECU 22, detection signals from the various sensors, and the like. Thus, the T/M_ECU 23 operates friction engagement elements, pulleys, and the like provided in the automatic transmission, and changes the engine output at a desired gear ratio. Further, the T/M_ECU 23 outputs signals of a shift position and the like detected by the various sensors to the travel_ECU 14.

On an output side of the BK_ECU 24, brake actuators 34 for adjusting brake fluid pressures output to brake wheel cylinders provided on the respective wheels are coupled. Further, various sensors such as a brake pedal sensor, a yaw rate sensor, a longitudinal acceleration sensor, and a vehicle speed sensor that is not illustrated are coupled to an input side of the BK_ECU 24.

The BK_ECU 24 performs drive control on the brake actuators 34 based on a control signal from the travel_ECU 14 or detection signals from various sensors. Thus, the BK_ECU 24 appropriately generates braking force for performing forced braking control, yaw rate control, and the like on the vehicle for each wheel. Further, the BK_ECU 24 outputs signals of a brake operation state, a yaw rate, a longitudinal acceleration, a vehicle speed, and the like detected by the various sensors to the travel_ECU 14.

An electric power steering motor 35 that applies steering torque by rotational force of a motor to a steering mechanism is coupled to an output side of the PS_ECU 25. Further, various sensors such as a steering torque sensor and a steering angle sensor are coupled to an input side of the PS_ECU 25.

The PS_ECU 25 performs drive control on the electric power steering motor 35 based on a control signal from the travel_ECU 14 or detection signals from various sensors. Accordingly, the PS_ECU 25 generates steering torque for the steering mechanism. Further, the PS_ECU 25 outputs signals of steering torque, steering angle, and the like detected by the various sensors to the travel_ECU 14. The locator unit 36 includes a GNSS sensor 36a, a high-precision road map database (road map DB) 36b, and the like.

The GNSS sensor 36a receives positioning signals transmitted from positioning satellites to position the position of the subject vehicle (latitude, longitude, altitude, and the like).

The road map DB 36b is a large storage medium such as an HDD or an SSD, and stores highly accurate road map information (dynamic map). The road map DB 36b holds lane width data, lane center position coordinate data, lane heading angle data, speed limit, and the like as lane data used for automatic driving. The lane data is stored in each lane on the road map at intervals of several meters. Further, the road map DB holds information of various facilities, parking lots, and the like. For example, the road map DB 36b outputs the road map information of a set range based on a vehicle position measured by the GNSS sensor 36a to the travel_ECU 14 as third surrounding environment information based on a request signal from the travel_ECU 14.

As described above, in the travel control apparatus 1 of the present embodiment, the road map DB 36*b* recognizes the third surrounding environment around the vehicle together with the GNSS sensor 36*a*. In one embodiment, the road map DB 36*b* serves as a "surrounding environment recognition device" together with the GNSS sensor 36*a*.

The left front side sensor 37*lf*, the right front side sensor 37*rf*, the left rear side sensor 37*lr*, and the right rear side sensor 37*rr* are sensors constituting the onboard radar apparatus 37, and include, for example, millimeter wave radars.

Here, each millimeter wave radar receives a reflected wave from an object and analyzes the output radio wave to detect a structure or the like (for example, a three-dimensional object or the like of a curbstone, a guardrail, a wall of a building or the like, a plant, or the like) provided at a road edge (for example, an end portion on the shoulder side) in addition to a three-dimensional object such as a pedestrian or another surrounding vehicle. Furthermore, each millimeter wave radar also detects a three-dimensional obstacle or the like present on the road. In this case, each radar detects a lateral width of the three-dimensional object, the position (relative position and relative distance to the vehicle) of the representative point of the three-dimensional object, the relative speed, and the like as specific information regarding the three-dimensional object.

Note that the left front side sensor 37*lf* and the right front side sensor 37*rf* are disposed on the left and right sides of the front bumper, respectively, for example. The left front side sensor 37*lf* and the right front side sensor 37*rf* detect, as second surrounding environment information, three-dimensional objects existing in left and right oblique front and side regions of the vehicle that are difficult to recognize from the image of the stereo camera 11.

Further, the left rear side sensor 37*lr* and the right rear side sensor 37*rr* are disposed on the left and right sides of the rear bumper, respectively, for example. The left rear side sensor 37*lr* and the right rear side sensor 37*rr* detect, as the second surrounding environment information, three-dimensional objects existing in left and right oblique lateral regions and rear regions of the vehicle that are difficult to recognize by the left front side sensor 37*lf* and the right front side sensor 37*rf*.

As described above, in the travel control apparatus 1 of the present embodiment, the onboard radar apparatus 37 (the left front side sensor 37*lf*, the right front side sensor 37*rf*, the left rear side sensor 37*lr*, and the right rear side sensor 37*rr*) recognizes the second ambient environment around the vehicle. In one embodiment, the onboard radar apparatus 37 (the left front side sensor 37*lf*, the right front side sensor 37*rf*, the left rear side sensor 37*lr*, and the right rear side sensor 37*rr*) may serves as a "surrounding environment recognition device". The acquired information of the sensors 37*lf*, 37*rf*, 37*lr*, and 37*rr* is sent to the image recognition_ECU 13.

The rear sensor 38 is configured by, for example, a sonar device or the like. The rear sensor 38 is disposed, for example, on the rear bumper. The rear sensor 38 detects, as fourth surrounding environment information, a three-dimensional object present in a region behind the vehicle that is difficult to recognize by the left rear side sensor 37*lr* and the right rear side sensor 37*rr*.

As described above, in the travel control apparatus 1 of the present embodiment, the rear sensor 38 recognizes the fourth surrounding environment around the vehicle. In one embodiment, the rear sensor 38 may serves as a "surrounding environment recognition device".

Note that all of the coordinates of each object outside the vehicle included in the first surrounding environment information recognized by the camera unit 10 including the image recognition_ECU 13, the third surrounding environment information recognized by the locator unit 36, the second surrounding environment information recognized by the onboard radar apparatus 37 (the left front side sensor 37*lf*, the right front side sensor 37*rf*, the left rear side sensor 37*lr*, the right rear side sensor 37*rr*), and the fourth surrounding environment information recognized by the rear sensor 38 are converted into coordinates in a three-dimensional coordinate system with the center of the vehicle as an origin in the travel_ECU 14.

In the travel_ECU 14, a manual driving mode, a first travel control mode and a second travel control mode which are modes for travel control, and a retreat mode are set as driving modes. Each of these operation modes can be selectively switched in the travel_ECU 14 based on, for example, an operation status and the like with respect to the mode switching switch provided in the HMI 31.

Here, the manual driving mode is a driving mode in which the driver keeps steering, and is, for example, a driving mode in which the vehicle is caused to travel in accordance with driving operations such as a steering operation, an accelerator operation, and a brake operation by the driver.

Further, the first travel control mode is similarly a driving mode that involves the driver to keep steering. That is, the first traveling control mode is, so to speak, a semi-automatic driving mode or a driving mode called a driving assistance mode to cause the vehicle to travel along the target traveling route mainly by appropriately combining and performing adaptive cruise control (ACC), active lane keep centering (ALKC) control, and active lane keep bouncing (ALKB) control through, for example, control of the E/G_ECU 22, the BK_ECU 24, the PS_ECU 25, and the like while reflecting the driving operation by the driver.

Here, the adaptive cruise control (ACC) is basically performed based on the first surrounding environment information input from the image recognition_ECU 13. That is, the adaptive cruise control (ACC) is performed, for example, based on preceding vehicle information or the like included in the first surrounding environment information from the image recognition_ECU 13.

Further, the active lane keep centering control and the active lane keep bouncing control are basically performed based on the first and third surrounding environment information input from at least one of the image recognition_ECU 13 or the locator unit 36. That is, the active lane keep centering control and the active lane keep bouncing control are performed based on, for example, lane dividing line information included in the third surrounding environment information and the like from the image recognition_ECU 13 or locator unit 36.

Further, the second travel control mode is an automatic driving mode that implements what is called a hands-off function to cause the vehicle to travel according to a target route (route map information) by performing mainly the adaptive cruise control, the active lane keep centering control, and the active lane keep bouncing control in an appropriate combination through control of, for example, the E/G_ECU 22, the BK_ECU 24, the PS_ECU 25, and the like without requiring steering, accelerator operation, and brake operation by the driver.

The retreat mode is a mode for automatically stopping the vehicle in a roadside strip or the like, for example, while traveling in the second travel control mode, when it is no longer possible to continue traveling in this mode and the driver cannot take over the driving operation (that is, when it is not possible to transition to the manual driving mode or the first travel control mode).

Further, in each of the above-described driving modes, when an obstacle or the like such as a three-dimensional object of a preceding vehicle, a falling object, or the like on the vehicle traveling road that has a possibility to collide with the vehicle is recognized, the travel_ECU 14 determines whether to execute obstacle avoidance control accompanied by emergency brake control (autonomous emergency braking (AEB) control) or emergency steering control, and executes predetermined control as appropriate.

Furthermore, the travel_ECU 14 calculates a predicted time to collision (TTC) between the vehicle and another vehicle to collide based on information of the other vehicle to collide, information of the vehicle, and the like included in the first surrounding environment information recognized by the image recognition_ECU 13. In one embodiment, the travel_ECU 14 may serve as a "collision time calculator".

Further, the travel_ECU 14 estimates a travel route of the other vehicle to collide, a collision position when the other vehicle to collide collides with the vehicle, and the like based on the calculated predicted time to collision. In one embodiment, the travel_ECU 14 may serve as a "collision object estimator".

The travel_ECU 14 estimates a travel range including an after-collision travel route of the vehicle based on the estimated collision position. In one embodiment, the travel_ECU 14 may serve as an "after-collision travel range estimator".

Note that all or part of the locator unit 36, the image recognition_ECU 13, the travel_ECU 14, the CP_ECU 21, the E/G_ECU 22, the T/M_ECU 23, the BK_ECU 24, the PS_ECU 25, and the like are configured by a processor including hardware.

Here, the processor is configured by, for example, a known configuration including a non-transitory computer readable medium and the like in addition to a central processing unit (CPU), a random access memory (RAM), a read only memory (ROM), a non-volatile memory, a non-volatile storage, and the like, peripheral devices thereof, and the like.

In the ROM, the non-volatile memory, the non-volatile storage, and the like, a software program executed by the CPU, fixed data such as a data table, and the like are stored in advance. The CPU reads a software program stored in the ROM or the like, develops the software program in the RAM, and executes the software program, and the software program appropriately refers to various data or the like, so that the respective functions of the components and the component units (13, 14, 21 to 25, and 36) are implemented.

Further, the processor may be configured by a semiconductor chip such as a field programmable gate array (FPGA). Furthermore, each of the components and the component units (13, 14, 21 to 25, and 36) and the like may be configured by an electronic circuit.

Furthermore, the software program may be recorded in whole or in part as a computer program product in a portable plate medium such as a flexible disk, a CD-ROM, or a DVD-ROM, a non-transitory computer readable medium such as a card type memory, a hard disk drive (HDD) device, or a solid state drive (SSD) device, or the like.

Note that, as the surrounding environment recognition device, for example, a monocular camera may be applied instead of (or in addition to) the stereo camera 11 included in the camera unit 10. Further, instead of (or in addition to) the onboard radar apparatus 37, for example, light detection and ranging (LiDAR) or the like can be applied.

Further, the travel control apparatus 1 of the present embodiment further includes a collision detector that detects a collision between the vehicle and another vehicle. The collision detector corresponds to, for example, the camera unit 10, the onboard radar apparatus 37, and the like as the surrounding environment recognition device. For example, the camera unit 10, the onboard radar apparatus 37, and the like can detect a collision with another vehicle, for example, based on distance information with another vehicle that is an object around the vehicle among various types of information regarding objects around the vehicle. Note that the collision detector is not limited to this configuration. For example, by separately providing a sensor that detects an impact or the like applied to the vehicle, the sensor can be configured as the collision detector.

Figure 2:
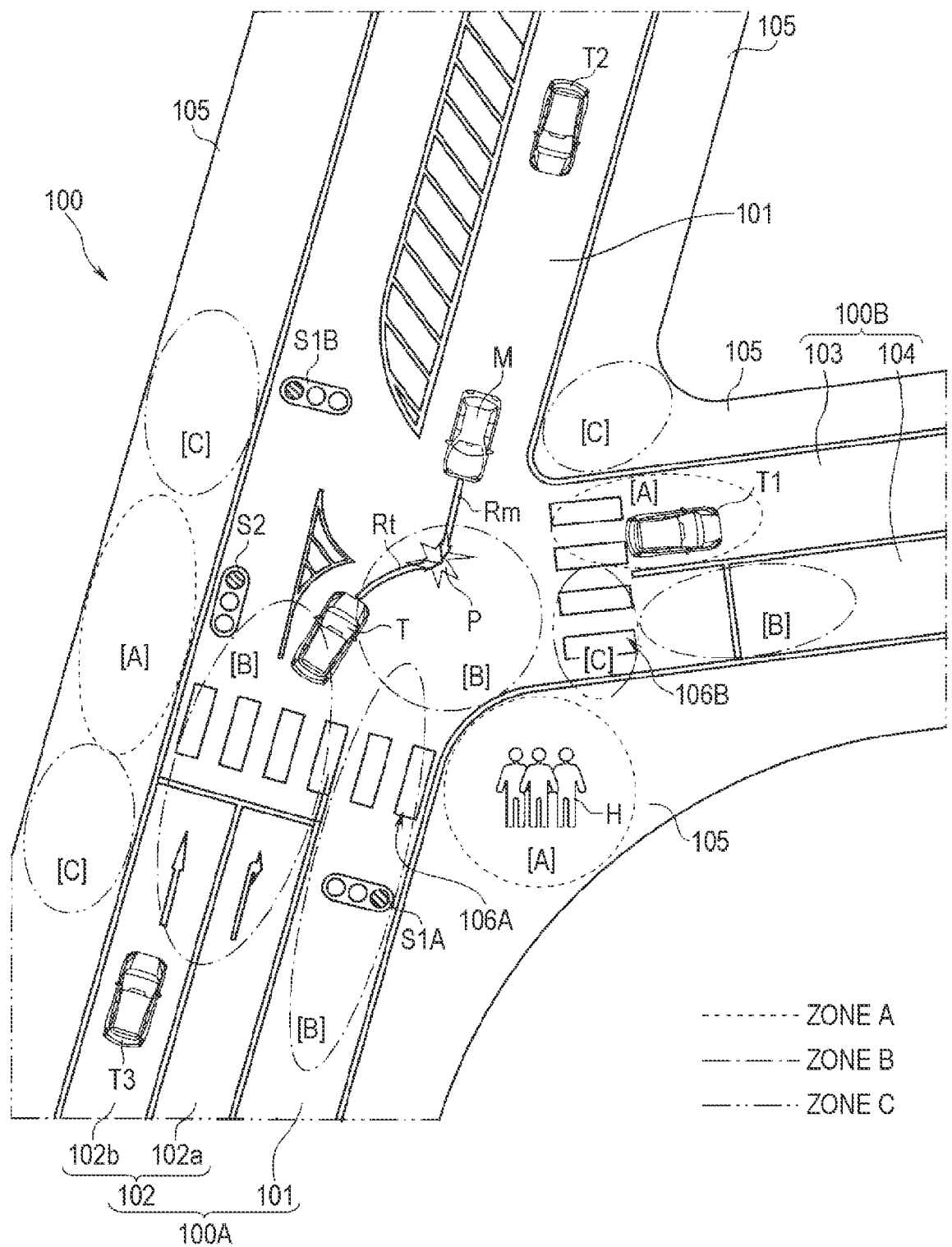
FIG. 2 is a diagram describing operation of the travel control apparatus of FIG. 1 and illustrating an example of a situation when a vehicle collides with another vehicle on a road.
Figure 3:
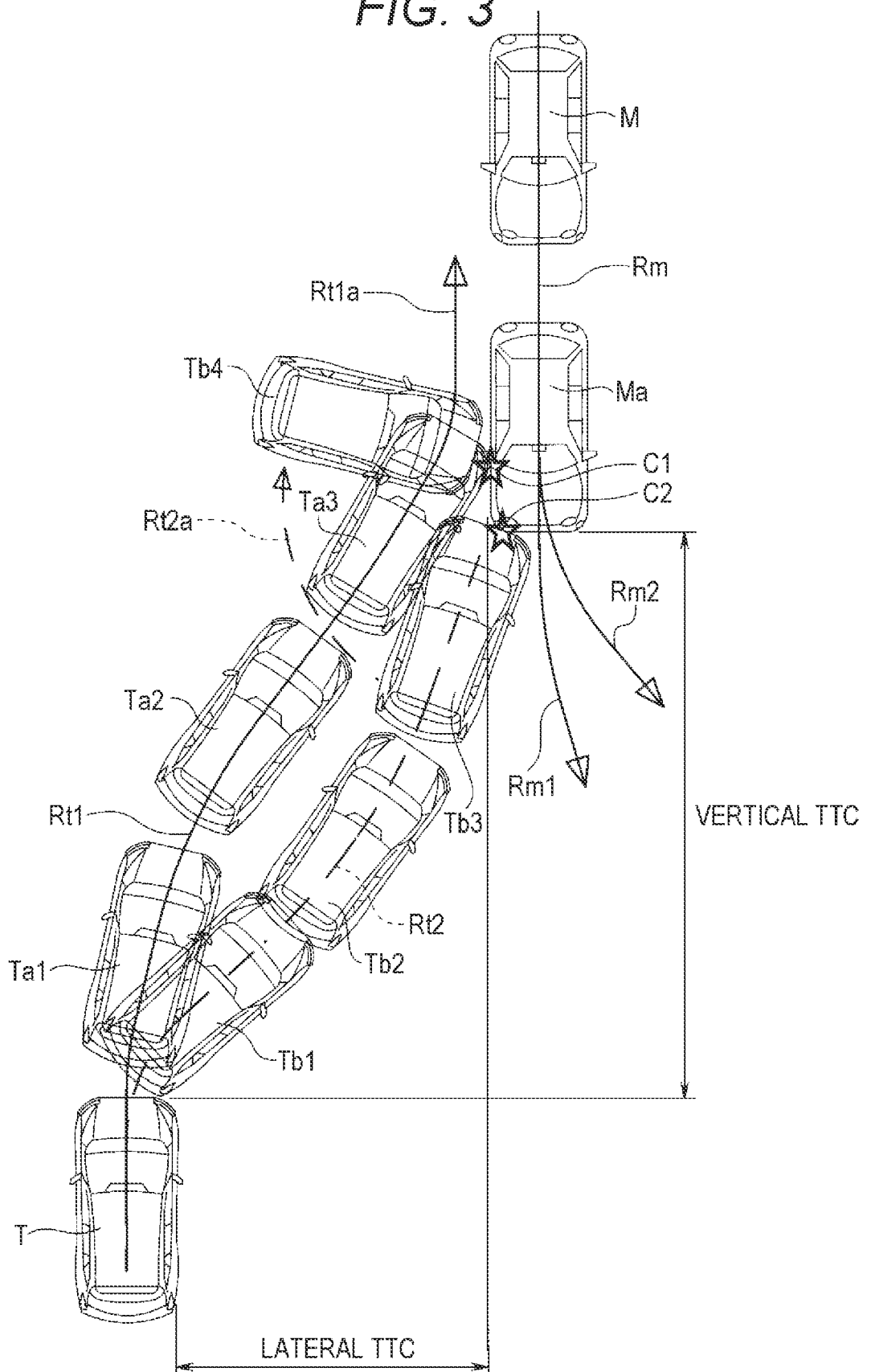
FIG. 3 is a diagram describing the operation of the travel control apparatus of FIG. 1, and illustrating two examples of trajectories of travel routes at a time of collision between the vehicle and another vehicle.
Figure 4:
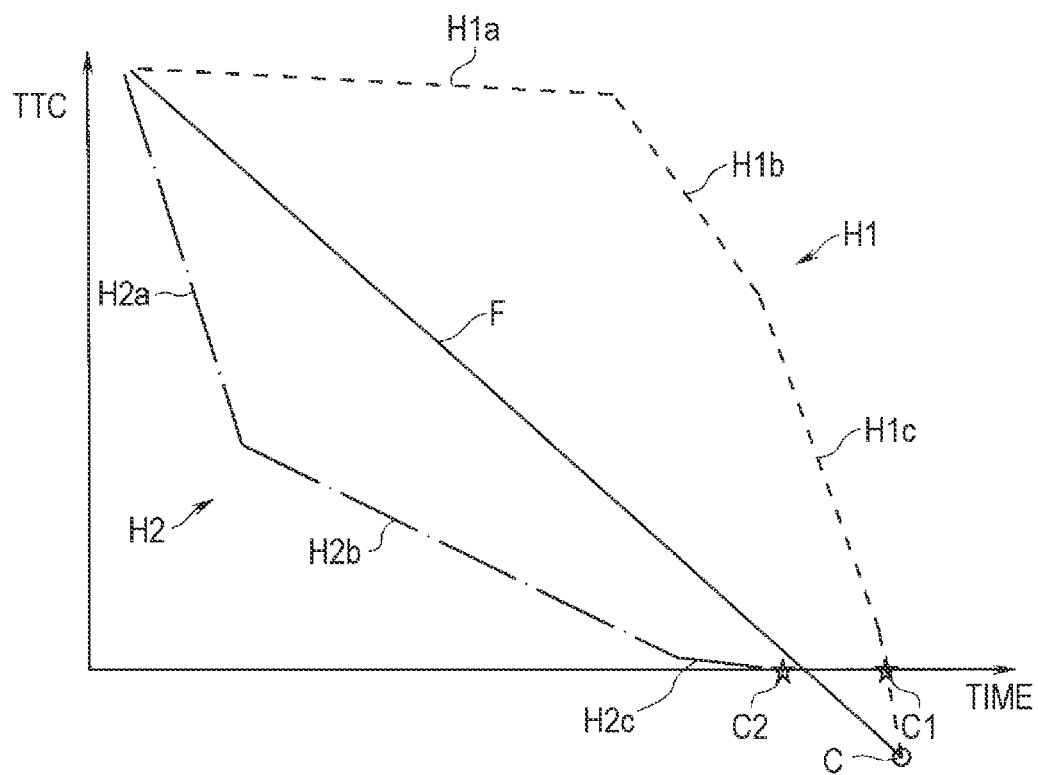
FIG. 4 is a diagram describing the operation of the travel control apparatus of FIG. 1, and is a conceptual diagram illustrating a temporal change in TTC during traveling on the travel routes of the two examples of FIG. 3.
Figure 5:
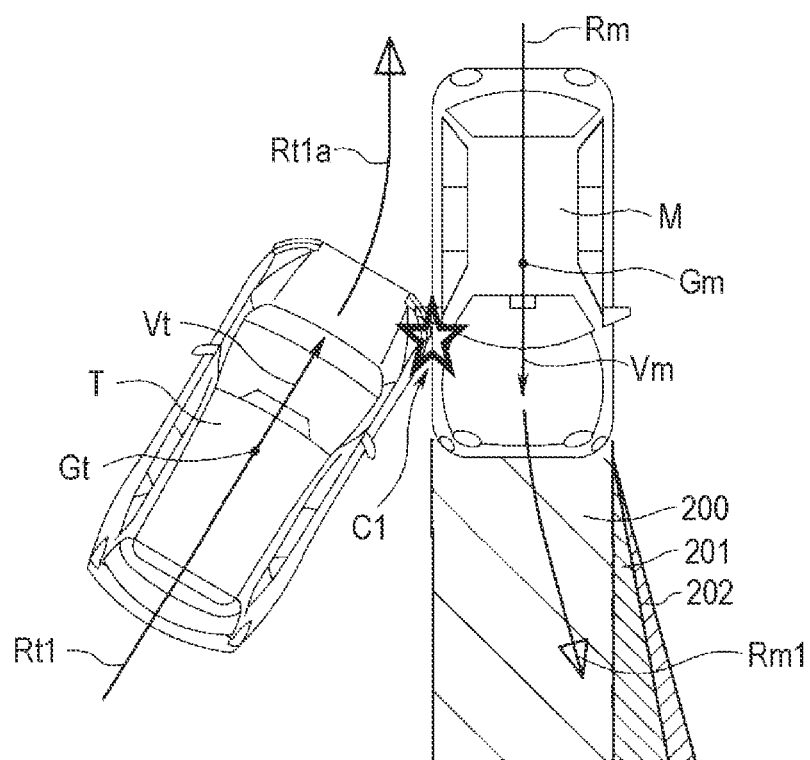
FIG. 5 is a diagram describing the operation of the travel control apparatus of FIG. 1, and is a diagram for estimating a travel route of the vehicle after collision at the time of collision between the vehicle and another vehicle.

Operation of the travel control apparatus 1 of the present embodiment configured as described above will be described below. FIGS. 2 to 7 are diagrams describing the operation of the travel control apparatus according to the embodiment of the disclosure. Among these, FIG. 2 is a diagram illustrating an example of a situation when the vehicle collides with another vehicle on a road. FIG. 3 is a diagram illustrating two examples of trajectories of travel routes at the time of collision between the vehicle and another vehicle. FIG. 4 is a conceptual diagram illustrating a temporal change in TTC during traveling on the travel routes of the two examples of FIG. 3. FIG. 5 is a diagram describing a procedure for estimating a travel route of the vehicle after collision at the time of collision between the vehicle and another vehicle.

Further, FIGS. 6 and 7 are flowcharts illustrating the travel control at the time of collision executed by the travel control apparatus for the vehicle according to the embodiment of the disclosure. Among these, FIG. 6 is a flowchart of a first half (from a start to a travel route estimation process at the time of collision) of the travel control at the time of collision executed by the travel control apparatus for the vehicle of the embodiment of the disclosure. FIG. 7 is a flowchart of a second half (travel control after the travel route estimation at the time of collision) of the travel control at the time of collision executed by the travel control apparatus for the vehicle according to the embodiment of the disclosure.

First, reference signs used in FIGS. 2 to 5 will be described below. In FIGS. 2, 3, and 5, a reference sign M denotes the vehicle on which the travel control apparatus 1 of the present embodiment is mounted. Note that, although details will be described later, a reference sign Ma in FIG. 3 denotes the position of the vehicle M after a predetermined time (at the time point of collision).

In FIGS. 2, 3, and 5, a reference sign T denotes another vehicle that has a possibility to collide (hereinafter referred to as another vehicle to collide) with the vehicle M. Note that, in FIG. 2, reference signs T1, T2, and T3 denote other vehicles (hereinafter referred to as surrounding other vehicles) traveling around the vehicle M. In FIG. 3, reference signs Ta1, Ta2, and Ta3 are reference signs for indicating position changes when the other vehicle T to collide travels on a first travel route Rt1 (as described in detail later). Similarly, in FIG. 3, reference signs Tb1, Tb2, Tb3, and Tb4 are reference signs for indicating position changes when the other vehicle T to collide travels on a second travel route Rt2 (as described in detail later).

In FIGS. 2, 3, and 5, a reference sign Rm denotes a travel route of the vehicle M. Note that, in FIGS. 3 and 5, a reference sign Rm1 denotes an estimated travel route of the vehicle M after colliding with the other vehicle T to collide traveling on the first travel route Rt1 (as described in detail later). Similarly, in FIG. 3, a reference sign Rm2 denotes an estimated travel route of the vehicle M after colliding with the other vehicle T to collide traveling on the second travel route Rt2 (as described in detail later).

In FIGS. 3 and 5, a reference sign Rt1 denotes a first travel route among the examples of the travel route of the other vehicle T to collide. Similarly, in FIG. 3, a reference sign Rt2 denotes the second travel route among the examples of the travel routes of the other vehicles T to collide.

In FIGS. 3 and 5, a reference sign Rt1a denotes an estimated travel route of the other vehicle T to collide after the other vehicle T to collide traveling on the first travel route Rt1 collides with the vehicle M. Similarly, in FIG. 3, a reference sign Rt2a denotes an estimated travel route (travel route) of the other vehicle T to collide after the other vehicle T to collide traveling on the second travel route Rt2 collides with the vehicle M.

In FIG. 2, a reference sign P denotes a collision point when the vehicle M and the other vehicle T to collide collide with each other. Note that, in FIG. 3, reference signs C1 and C2 denote collision positions on the vehicle M. Among these, the reference sign C1 denotes a collision position on the vehicle M when the other vehicle T to collide traveling on the first travel route Rt1 collides with the vehicle M. Similarly, the reference sign C2 denotes a collision position on the vehicle M when the other vehicle T to collide traveling on the second travel route Rt2 collides with the vehicle M.

In FIG. 2, a reference sign 100 denotes an intersection on a road on which the vehicle M, the other vehicle T to collide, and others are traveling. The intersection 100 is exemplified as what is called a T-shaped intersection. The intersection 100 is formed by two straight roads 100A and 100B intersecting with each other.

The straight road 100A includes a lane 101 on which the vehicle M is traveling (hereinafter referred to as the lane 101) and a lane 102 facing the lane 101 (hereinafter referred to as the opposite lane 102). Furthermore, the opposite lane 102 includes a right turn lane 102a and a straight lane 102b near the intersection 100. FIG. 2 illustrates a situation where another vehicle T to collide is present on the extension of the right turn lane 102a in the intersection 100.

Further, FIG. 2 illustrates a situation where another vehicle T2 following the vehicle M is present behind the vehicle M on the lane 101. Similarly, a situation where another vehicle T3 is present in the dedicated straight lane 102b of the opposite lane 102 is illustrated.

A straight road 100B (hereinafter referred to as the intersecting road 100B) on a side to intersect the straight road 100A including the lane 101 (hereinafter simply referred to as the straight road 100A) is illustrated as a road including two lanes 103 and 104. Here, the lane 103 is a lane on which the other vehicle T to collide is to proceed after turning right. FIG. 2 illustrates a situation where a preceding other vehicle T1 is present on the lane 103.

FIG. 2 illustrates a situation where crosswalks 106A and 106B are provided in a region in front of the intersection 100 on the straight road 100A and the intersecting road 100B, respectively. Further, FIG. 2 illustrates a situation where sidewalks 105 are provided along both sides of each of the straight road 100A and the intersecting road 100B.

Note that reference signs S1A, S1B, and S2 in FIG. 2 denote traffic lights installed at the intersection 100. Among them, the reference sign S1A is an instruction signal to a group of vehicles including the vehicle M on the lane 101. The reference sign S1B denotes an instruction signal for a group of vehicles including the other vehicle T to collide and others on the opposite lane 102. The reference sign S2 denotes an instruction signal for a group of vehicles on the lane 104 of the intersecting road 100B. Note that, in FIG. 2, a situation is assumed in which the traffic lights S1A and S1B have the "green light" on, and the traffic light S2 has the "red light" on.

Further, in FIG. 2, a reference sign H denotes pedestrians or the like waiting at the traffic light on a sidewalk.

On the other hand, in FIG. 2, respective regions indicated by dotted lines, alternate long and short dash lines, and an alternate long and two short dashes lines indicates regions set by the travel control apparatus 1 for the vehicle M with respect to the surrounding region of the vehicle M including the intersection 100.

As described above, the travel control apparatus 1 (image recognition_ECU 13) of the present embodiment sets safety degree regions corresponding to safety degrees in the surrounding region of the vehicle M. The regions indicate safety degree regions that are set depending on respective safety degrees.

Here, the safety degrees are stepwise degrees based on criteria that no problem occurs even if the vehicle M after the collision travels or no problem occurs even if the vehicle M after the collision continues to stop.

For example, when travel control of guiding the vehicle to a predetermined region is performed by performing travel control of the vehicle M after collision, it is desirable to perform travel control of guiding the vehicle to a safer region. In this case, regarding the safer region, for example, a region where a pedestrian or the like or another vehicle or the like does not currently exist around the vehicle M, or a region where a pedestrian or the like or another vehicle or the like does not currently exist even after a lapse of a predetermined time, or the like corresponds to the safest region.

Accordingly, for example, a region of a zone A indicated by a dotted line and a reference sign [A] in FIG. 2 is indicated as a low safety degree region with low safety. For example, the zone A corresponds to a region where there is a high possibility that a pedestrian, a bicycle, and the like frequently exist, for example, on a crosswalk, on a sidewalk, or the like. Furthermore, the zone A also corresponds to a region where there is a high possibility that another preceding vehicle T1 or the like after passing through the intersection 100 is present, such as on the lane 103 of the intersecting road 100B.

On the other hand, the region of the zone B indicated by the alternate long and short dash line and a reference sign [B] in FIG. 2 is indicated as a medium safety degree region having a medium safety degree region. This zone B corresponds to, for example, a region where it is recognized that nothing is present at the present time (collision time point) for example, but other vehicles T2, T3, and the like are likely to enter after a predetermined time elapses.

On the other hand, the region of the zone C indicated by the alternate long and two short dashes lines and a reference sign [C] is indicated as a high safety degree region having a high safety degree. This zone C corresponds to, for example, a region where it is recognized that nothing is present at the present time (collision time point) for example, and there is no possibility that another vehicle or the like enters even after a predetermined time elapses.

Note that, in FIG. 2, the zone C is set on the sidewalks 105, for example. If no pedestrian or the like is present in this region at the present time (collision time point), the region can be set as the zone C based on the idea that no problem occurs even if the vehicle after collision is guided toward the region (on the sidewalk or the like). Further, assuming that the vehicle after collision is guided to the region (on the sidewalk or the like) and then stopped, even if, for example, a pedestrian or the like enters the region in a predetermined time, no problem occurs because the vehicle is in a stopped state, and based on this thought, the region can be set as the zone C.

In the travel control apparatus 1 of the present embodiment, safety degree regions (zone A, zone B, and zone C) obtained by dividing a surrounding region into regions depending on the safety degrees are constantly set while the vehicle M is traveling. Note that the handling of the safety degree regions in the travel control apparatus 1 of the present embodiment will be described later.

Next, a situation when, in the travel control by the travel control apparatus 1 of the present embodiment, travel control at the time of collision for estimating a travel route of the vehicle after collision and correcting the estimated travel route of the vehicle at the time of collision between the vehicle and another vehicle is executed will be briefly described below.

A situation where the vehicle M on which the travel control apparatus 1 of the present embodiment is mounted and other vehicles T, T1, T2, T3, and the like are traveling in the vicinity of the intersection 100 as illustrated in FIG. 2 will be considered.

At this time, it is assumed that the vehicle M is traveling along the travel route Rm on the lane 101 in the vicinity of the intersection 100 illustrated in FIG. 2. Here, as indicated by the travel route Rm, the vehicle M is going straight through the intersection 100.

At this time, it is assumed that another vehicle T that is going to turn right along the travel route Rt from the right turn lane 102a of the opposite lane 102 is present in the intersection 100. Under such a situation, there is a possibility that (the driver of) the other vehicle T starts to make a right turn without noticing the presence of the vehicle M even though the vehicle M is approaching, or by determining that a right turn can be completed before the vehicle M arrives. Under this situation, the other vehicle T waiting for right turn in the intersection 100 is recognized as the other vehicle T to collide that has a possibility to collide with the vehicle M traveling straight.

Under the situation as illustrated in FIG. 2, various situations can be considered for the situation when the vehicle M collides with the other vehicle T to collide. Two examples will be considered as illustrated in FIG. 3, for example.

When the other vehicle T to collide makes a right turn at the intersection 100 collides with the vehicle M traveling straight along the travel route Rm at the intersection 100, there are conceivable cases where: (1) the other vehicle T to collide travels along the first travel route Rt1 and collides with the vehicle M at a collision position (part of a side surface of the vehicle M) denoted by the reference sign C1 in FIG. 3; and (2) the other vehicle T to collide travels along the second travel route Rt2 and collides with the vehicle M at a collision position (part of a substantially front surface of the vehicle M) denoted by the reference sign C2 in FIG. 3.

When the other vehicle T to collide making a right turn at the intersection 100 collides with the vehicle M traveling along the travel route Rm and traveling straight at the intersection 100, the collision position (C1 or C2) on the vehicle M can be estimated generally as follows.

FIG. 4 illustrates temporal changes in the vertical TTC and the lateral TTC when the other vehicle T to collide collides with the vehicle M on the two travel routes illustrated in FIG. 3.

As illustrated in FIG. 3, the vertical TTC is a TTC focused on the traveling direction (vertical direction) of the vehicle M and the other vehicle T to collide. Further, the lateral TTC is a TTC focused on a direction (lateral direction) orthogonal to the traveling directions of the vehicle M and the other vehicle T to collide.

The graph illustrated in FIG. 4 assumes a situation where the vehicle M and the other vehicle T to collide travel opposite to each other, and the vehicle M and the other vehicle T approach each other in both the vertical direction and the lateral direction while traveling. For example, assuming the situation illustrated in FIG. 2, a case where the vehicle M traveling straight collides with the other vehicle T to collide turning right will be considered.

Note that, in the graph illustrated in FIG. 4, the TTC is quantified based on a predetermined point (for example, centroid point; see reference signs Gm and Gt in FIG. 5) of each of the vehicles (M and T). Thus, on the graph of FIG. 4, when the centroid points Gm and Gt coincide with each other, it means that the vehicles (M and T) collide with each other (see the reference sign C in FIG. 4). From this, the point denoted by the reference sign C is illustrated in the minus TTC region on the graph of FIG. 4. However, considering the actual collision between the vehicles, a collision occurs between the outer surfaces of the respective vehicles at a stage before the respective centroid points Gm and Gt coincide with each other (see the reference signs C1 and C2 in FIG. 3). In this case, the reference signs C1 and C2 in FIG. 3 denote that the collision occurs at the time of TTC=0.

FIG. 3 illustrates the situation of FIG. 2 in more detail. As illustrated in FIG. 3, the vertical TTC of the vehicle M and the other vehicle T to collide approaching each other decreases in proportion to the lapse of time as indicated by reference sign F in FIG. 4. On the other hand, the lateral TTC differs between when the other vehicle T to collide travels on the first travel route Rt1 and when the other vehicle T to collide travels on the second travel route Rt2.

That is, a reference sign H1 in FIG. 4 denotes a temporal change in the lateral TTC when the other vehicle T to collide travels on the first travel route Rt1. Further, in FIG. 4, a reference sign H2 denotes a temporal change in the lateral TTC when the other vehicle T to collide travels on the second travel route Rt2.

First, a case where the other vehicle T to collide travels on the first travel route Rt1 and collides with the vehicle M will be considered. In this case, the lateral TTC when the other vehicle T to collide moves from the position T to the position Ta1 illustrated in FIG. 3 transitions with a gentle gradient H1a as illustrated in FIG. 4. Subsequently, when the other vehicle T to collide moves from the position Ta1 to the position Ta2 in FIG. 3, the lateral TTC transitions with a steep gradient H1b as illustrated in FIG. 4. Subsequently, when the other vehicle T to collide moves from the position Ta2 to the position Ta3 in FIG. 3, the lateral TTC transitions with a steeper gradient H1c as illustrated in FIG. 4. Then, the other vehicle T to collide and the vehicle M collide with each other at the reference sign C1 in FIGS. 3 and 4.

In such a case, it can be estimated that the vehicle M after the collision follows a route as indicated by the estimated travel route Rm1, for example. Further, at this time, it can be estimated that the other vehicle T to collide after the collision follows a route such as the estimated travel route Rt1a.

Next, a case where the other vehicle T to collide travels on the second travel route Rt2 and collides with the vehicle M will be considered. In this case, the lateral TTC when the other vehicle T to collide moves from the position T to the position Tb1 illustrated in FIG. 3 transitions with a steep gradient H2a as illustrated in FIG. 4. Subsequently, when the other vehicle T to collide moves from the position Tb1 to the position Tb2 in FIG. 3, the lateral TTC transitions with a slightly gentle gradient H2b as illustrated in FIG. 4. Subsequently, when the other vehicle T to collide moves from the position Tb2 to the position Tb3 in FIG. 3, the lateral TTC transitions with a more gradual gradient H2c as illustrated in FIG. 4. Then, at a reference sign C2 in FIGS. 3 and 4, the other vehicle T to collide and the vehicle M collide with each other.

In such a case, it can be estimated that the vehicle M after the collision follows a route indicated by the estimated travel route Rm2, for example. Further, at this time, it can be estimated that the other vehicle T to collide after the collision takes a route like the estimated travel route Rt2a (behavior of rotating around the collision position C2).

As described above, under the situation as illustrated in FIG. 2, when the vehicle M collides with the other vehicle T to collide, it is considered that the travel route of the vehicle M after the primary collision changes depending on the collision position. As described above, the change in the travel route of the vehicle M after the collision can be roughly estimated by obtaining a collision moment using some parameters such as the travel speed of the vehicle M, the travel speed of the other vehicle T to collide, the collision position of the vehicle M, and the collision angle of the other vehicle T to collide with the collision position.

Furthermore, it has been found that, in addition to these parameters, additional parameters such as the vehicle weight of the vehicle M and the other vehicle T to collide greatly affect the change in the travel route after the collision. Accordingly, the outline of the travel route of the vehicle M after the collision can be estimated by further considering a correction value by the additional parameter such as the vehicle weight with respect to the change amount of the travel route roughly estimated as described above.

As illustrated in FIG. 5, for example, a travel range including a travel route when the vehicle M travels straight at the vehicle speed Vm along the travel route Rm is indicated by a range denoted by a reference sign 200 in FIG. for example.

It is assumed that the other vehicle T to collide traveling at a predetermined angle with respect to the travel route Rm of the vehicle M at a vehicle speed Vt along the travel route Rt1 with respect to the vehicle M traveling straight in this manner collides with the collision position C1 on the side surface of the vehicle M.

When the estimated travel route Rm1 of the vehicle M at this time is defined, the estimated travel range is a range denoted by a reference sign 201. When the correction value is further considered for the estimated travel range 201, a corrected estimated travel range of the vehicle M can be estimated as indicated by a reference sign 202.

Accordingly, in the travel control apparatus 1 of the present embodiment, an approximate travel route of the other vehicle T to collide and a rough collision position with respect to the vehicle M are estimated based on the temporal change in the lateral TTC in the vehicle M and the other vehicle T to collide.

That is, as described in FIG. 4, for example, when the lateral TTC is as denoted by the reference sign H1, it can be estimated that the other vehicle T to collide collides with the collision position C1 (a part of the substantially side surface of the vehicle M). Furthermore, considering the correction value, the corrected estimated travel range 202 (see FIG. 5) of the vehicle M after the collision can be estimated.

Note that, as described above, the vehicle weight of the vehicle M and the other vehicle T to collide and the like can be considered as the additional parameter. Here, as vehicle weight data of the vehicle M, numerical data defined based on a vehicle type or the like is stored in advance in a predetermined storage of the travel control apparatus 1. Further, the vehicle weight data of the other vehicle T to collide can be set with reference to a correction data table stored in advance in a predetermined storage of the travel control apparatus 1 based on, for example, information (information such as a vehicle type and a vehicle size, and the like) regarding the other vehicle T to collide acquired using the surrounding environment recognition device such as the camera unit 10 or the onboard radar apparatus 37.

Next, travel control at the time of collision executed by the travel control apparatus for the vehicle according to the embodiment of the disclosure will be described below with reference to flowcharts of FIGS. 6 and 7.

It is assumed that the vehicle M on which the travel control apparatus 1 of the present embodiment is mounted is traveling under a situation as illustrated in FIG. 2 as described above.

In this case, in step S1 of FIG. 6, the travel control apparatus 1 of the vehicle M continuously executes recognition processing of the surrounding environment of the traveling vehicle M using various sensor devices.

Subsequently, in step S2, the travel control apparatus 1 sets safety degree regions obtained by dividing the surrounding region of the vehicle M into regions depending on the safety degrees. Here, as described above, the safety degree is set as a simple three-stage degree such as A, B, and C. Then, respective safety degree regions in which the safety degrees A, B, and C of respective stages are set are set as, for example, zone A, zone B, zone C, or the like. In the travel control apparatus 1 of the present embodiment, such safety degree region setting processing is continuously and constantly performed while the vehicle M is traveling.

Subsequently, in step S3, the travel control apparatus 1 checks whether an object that has a possibility to collide with the vehicle M has been detected based on the recognized surrounding environment of the vehicle M. Here, examples of the object that has a possibility to collide with the vehicle M include another vehicle traveling on the opposite lane 102 and another vehicle waiting for right turn in the intersection 100 or the like. Under the situation illustrated in FIG. 2, another vehicle that is present on the extension of the right turn lane 102a in the intersection 100 and is waiting for right turn is recognized as another vehicle T to collide.

When the other vehicle T to collide as an object that has a possibility to collide with the vehicle M is detected in the process of step S3, the process proceeds to the next step S4. Note that, in step S3, when the other vehicle T to collide is not detected, a loop process is performed. In this case, when the detected object that has a possibility to collide is not another vehicle, for example, when the object is a fallen object or the like on a road, a parked vehicle, a bicycle running on a roadway, or the like, another travel control process (for example, known obstacle avoidance traveling control or the like) different from the present processing sequence may be executed. The detailed description and illustration in that case are omitted because they are not directly related to the disclosure.

In step S4, the travel control apparatus 1 executes processing of calculating the vertical TTC and the lateral TTC when the detected other vehicle T to collide and the vehicle M collide with each other.

Subsequently, in step S5, the travel control apparatus 1 estimates the travel route of the other vehicle T to collide based on the temporal change in the lateral TTC.

Subsequently, in step S6, the travel control apparatus 1 estimates the collision position of the other vehicle T to collide with the vehicle M based on the estimated travel route of the other vehicle T to collide, the temporal change in the longitudinal and lateral TTC, and the like.

Next, in step S7, the travel control apparatus 1 estimates the travel route of the vehicle M after the collision.

Subsequently, in step S8, the travel control apparatus 1 uses various sensor devices (surrounding environment recognition device) to confirm whether the collision of the other vehicle T to collide with the traveling vehicle M has been detected. Here, when the collision is detected, the process proceeds to step S11 in FIG. 7. Further, when no collision is detected, the process returns to step S3 described above, and the subsequent process is repeated.

Next, in step S11 of FIG. 7, the travel control apparatus 1 checks the degree of safety of the safety degree region on the estimated travel route of the vehicle M and in the vicinity thereof.

Subsequently, in step S12, the travel control apparatus 1 checks whether the zone A exists on the estimated travel route of the vehicle M. Here, when it is confirmed that the zone A exists on the estimated travel route of the vehicle M, the process proceeds to the next step S13. Further, when the zone A does not exist on the estimated travel route of the vehicle M, the process proceeds to step S15.

In step S13, the travel control apparatus 1 executes travel control for preventing entry of the vehicle M into the zone A confirmed on the estimated travel route. In the travel control executed in this case, for example, braking control, steering control, throttle drive control, and the like are appropriately executed.

Subsequently, in step S14, the travel control apparatus 1 confirms whether the vehicle M has stopped in a region other than the zone A. Here, when it is confirmed that the vehicle M has stopped in a region other than the zone A, the series of processes is ended (return). On the other hand, when it is not confirmed that the vehicle M has stopped in a region other than the zone A, the process returns to step S13 described above, and the similar traveling control is repeated.

On the other hand, in step S15, the travel control apparatus 1 checks whether the zone B exists on the estimated travel route of the vehicle M. Here, when the presence of the zone B on the estimated travel route of the vehicle M is confirmed, the process proceeds to the next step S16. Further, when the zone B does not exist on the estimated travel route of the vehicle M, it is determined that the zone C exists on the estimated travel route of the vehicle M. Then, the process proceeds to step S20.

In step S20, the travel control apparatus 1 executes stop control for stopping the vehicle M by performing braking control.

Subsequently, in step S21, the travel control apparatus 1 confirms whether the vehicle M has stopped. Here, when it is confirmed that the vehicle M has stopped, the series of processes is ended (return). On the other hand, when the vehicle M is not stopped, the process returns to step S20 described above, and the similar stop control is repeated.

On the other hand, in step S16, the travel control apparatus 1 confirms whether it can be predicted that the state of the zone B on the estimated travel route of the vehicle M is continuously maintained even after a predetermined time elapses. Here, the prediction of the state of the zone B after a lapse of the predetermined time can be determined by whether another vehicle or the like is recognized around the zone B.

If it is determined in the process of step S16 described above that there is no change after the predetermined time in the zone B on the estimated travel route (if it is determined that the zone B is maintained), the process proceeds to the next process of step S17. Further, when it is determined that the zone B on the estimated travel route changes (when a change to the zone C is predicted), the process proceeds to step S20.

In step S17, the travel control apparatus 1 checks whether the zone C exists on the estimated travel route of the vehicle M or in a region in the vicinity thereof. Here, when it is confirmed that the zone C exists on the estimated travel route of the vehicle M or in a region in the vicinity thereof, the process proceeds to the next step S18. Further, if there is no zone C on the estimated travel route of the vehicle M or in the vicinity thereof, the process proceeds to step S20.

In step S18, the travel control apparatus 1 executes travel control for guiding the vehicle M to the zone C. In the travel control in this case, for example, braking control, steering control, throttle drive control, and the like are appropriately executed. Then, when it is determined that the vehicle M is guided to the zone C, the stop control is subsequently executed.

Then, in step S19, the travel control apparatus 1 confirms whether the vehicle M has stopped in the zone C. Here, when it is confirmed that the vehicle M has stopped, the series of processes is ended (return). On the other hand, when the vehicle M is not stopped, the process returns to step S18 described above, and the similar travel control is repeated.

As described above, according to the above embodiment, the travel control apparatus 1 sets the safety degree regions depending on the safety degrees in the surrounding region of the vehicle while recognizing the surrounding environment of the traveling vehicle M, and recognizes an object that has a possibility to collide with the vehicle M as the other vehicle T to collide.

Then, when the other vehicle T to collide is recognized, a predicted time to collision (vertical and lateral TTC) between the vehicle M and the other vehicle T to collide is calculated, and a travel route of the other vehicle T to collide and a collision position with the vehicle M are estimated based on the calculated predicted time to collision.

Further, the travel range of the vehicle M after collision is estimated based on the estimated collision position, and the estimated travel range of the vehicle after collision is corrected based on vehicle weight information or the like of the other vehicle to collide.

With such a configuration, according to the travel control apparatus 1 of the present embodiment, the estimated travel route of the vehicle M after collision can be estimated based on the predicted time to collision (vertical and lateral TTC) between the vehicle M and the other vehicle T to collide. In this case, since only rough estimation processing is performed without accurately performing complicated arithmetic processing, it is possible to contribute to cost reduction of the arithmetic device. Further, since it is possible to contribute to shortening of the calculation time, it is possible to perform the travel control process having excellent responsiveness.

Note that, in the above-described embodiment, a situation where the vehicle M travels straight and passes through the intersection 100, and the other vehicle T to collide makes a right turn in the intersection 100 to thereby collide with the vehicle M has been described as an example, but the situation at the time of collision is not limited to such an example. For example, even in a situation where the other vehicle T to collide travels straight and passes through the intersection 100, and the vehicle M makes a right turn in the intersection 100 and collides with the other vehicle T to collide, the disclosure can be similarly applied, and substantially similar effects can be obtained.

The disclosure is not limited to the above-described embodiments, and it is a matter of course that various modifications and applications can be implemented without departing from the gist of the disclosure. Furthermore, the above-described embodiments include inventions at various stages, and various inventions can be extracted by appropriately combining disclosed constituent elements. For example, when the problem to be solved in the disclosure can be solved and the effect of the disclosure can be obtained even if some constituent elements are deleted from all the constituent elements described in the embodiments, the configuration from which the constituent elements are deleted can be extracted as an invention. Furthermore, the components of different embodiments may be appropriately combined. This disclosure is not limited by its specific implementations other than by the appended claims.

According to the disclosure, it is possible to provide a travel control apparatus for a vehicle capable of quickly estimating a travel route of a vehicle after a primary collision by an easier and simpler method without performing complicated arithmetic processing.

The invention claimed is:

1. A travel control apparatus for a vehicle, the travel control apparatus comprising:
   one or more processors; and
   one or more memories storing instructions for causing the one or more processors to:
      receive, from at least one sensor, information on a surrounding environment of the vehicle;
      recognize a surrounding region of the vehicle based on the received information;
      set safety degree regions by dividing the surrounding region of the vehicle into the safety degree regions based on safety degrees, each of the safety degree regions corresponding to a respective safety degree;
      recognize an object that has a possibility to come into collision with the vehicle in the surrounding environment of the vehicle;
      calculate a predicted time to the collision between the vehicle and the object, the predicted time comprising a vertical time to collision and a lateral time to collision between the vehicle and the object;
      based on the calculated predicted time to the collision, estimate a travel route of the object and a collision position on the vehicle where the object collides with the vehicle, the travel route of the object being estimated based on a temporal change in the lateral time to collision;
      estimate a travel range of the vehicle after the collision based on the estimated collision position;
      in response to detecting the collision of the object with the vehicle, determine whether there is a safety degree region within the surrounding region of the vehicle after the collision that corresponds to a predetermined high safety degree; and
      in response to determining that there is the safety degree region within the surrounding region of the vehicle after the collision that corresponds to the predetermined high safety degree, execute a travel control of the vehicle to guide the vehicle to the safety degree region corresponding to the predetermined high safety degree.

2. The travel control apparatus for the vehicle according to claim 1, wherein the object is a moving object present in a forward region in a traveling direction of the vehicle and is another vehicle traveling toward the vehicle.

3. The travel control apparatus for the vehicle according to claim 2, wherein the one or more processors are further configured to correct the estimated travel range after the collision of the vehicle based on feature information of the another vehicle acquired in the surrounding environment.

4. The travel control apparatus for the vehicle according to claim 3, wherein the feature information includes information on vehicle weight of the another vehicle.

5. The travel control apparatus for the vehicle according to claim 1, wherein the predetermined high safety degree indicates no safety issue for the vehicle to travel or stop within the safety degree region corresponding to the predetermined high safety degree after the collision.

6. The travel control apparatus for the vehicle according to claim 1, execute the travel control of the vehicle to guide the vehicle to the safety degree region further comprising:
   execute a stop control to stop the vehicle within the safety degree region corresponding to the predetermined highest safety degree.

7. The travel control apparatus for the vehicle according to claim 1, wherein the one or more processors are configured to:
   in response to determining that no safety degree region within the surrounding region of the vehicle after the collision that corresponds to the predetermined highest safety degree, execute a stop control to stop the vehicle.

8. The travel control apparatus for the vehicle according to claim 1, wherein the one or more processors are configured to:
   in response to detecting a collision of the object with the vehicle, determine whether there is a safety degree region within the surrounding region of the vehicle after the collision that corresponds to a predetermined low safety degree, the predetermined low safety degree indicating a highest possibility that another object presents in the safety degree region corresponding to the predetermined low safety degree among the safety degree regions, and
   in response to determining that there is the safety degree region within the surrounding region of the vehicle after the collision that corresponds to the predetermined low safety degree, execute the travel control of the vehicle to prevent the vehicle from entering into the safety degree region corresponding to the predetermined low safety degree.

9. The travel control apparatus for the vehicle according to claim 1, wherein the collision position on the vehicle where the object collides with is estimated based on the estimated travel route of the object.

10. A travel control apparatus for a vehicle, the travel control apparatus comprising:
a surrounding environment recognition device comprising a sensor, the surrounding environment recognition device being configured to recognize a surrounding environment of the vehicle; and
a circuitry configured to
receive, from the sensor, information on the surrounding environment of the vehicle,
recognize a surrounding region of the vehicle based on the received information,
set safety degree regions by dividing the surrounding region of the vehicle into the safety degree regions based on safety degrees, each of the safety degree regions corresponding to a respective safety degree,
recognize an object that has a possibility to come into collision with the vehicle in the recognized surrounding environment of the vehicle,
calculate a predicted time to the collision between the vehicle and the object, the predicted time comprising a vertical time to collision and a lateral time to collision between the vehicle and the object,
based on the calculated predicted time to the collision, estimate a travel route of the object and a collision position on the vehicle where the object collides with the vehicle, the travel route of the object being estimated based on a temporal change in the lateral time to collision,
estimate a travel range of the vehicle after the collision based on the estimated collision position,
in response to detecting the collision of the object with the vehicle, determine whether there is a safety degree region within the surrounding region of the vehicle after the collision that corresponds to a predetermined high safety degree, and
in response to determining that there is the safety degree region within the surrounding region of the vehicle after the collision that corresponds to the predetermined high safety degree, execute a travel control of the vehicle to guide the vehicle to the safety degree region corresponding to the predetermined high safety degree.

11. The travel control apparatus for the vehicle according to claim 10, wherein the predetermined high safety degree indicates no safety issue for the vehicle to travel or stop within the safety degree region corresponding to the predetermined high safety degree after the collision.

12. The travel control apparatus for the vehicle according to claim 10, wherein the object is a moving object present in a forward region in a traveling direction of the vehicle and is another vehicle traveling toward the vehicle.

13. The travel control apparatus for the vehicle according to claim 12, wherein the circuitry is further configured to correct the estimated travel range after the collision of the vehicle based on feature information of the another vehicle.

14. The travel control apparatus for the vehicle according to claim 13, wherein the feature information includes information on vehicle weight of the another vehicle.

15. The travel control apparatus for the vehicle according to claim 10, execute the travel control of the vehicle to guide the vehicle to the safety degree region further comprising:
execute a stop control to stop the vehicle within the safety degree region corresponding to the predetermined highest safety degree.

16. The travel control apparatus for the vehicle according to claim 10, wherein the circuitry is configured to:
in response to determining that no safety degree region within the surrounding region of the vehicle after the collision that corresponds to the predetermined high safety degree, execute a stop control to stop the vehicle.

17. The travel control apparatus for the vehicle according to claim 10, wherein the circuitry is configured to:
in response to detecting a collision of the object with the vehicle, determine whether there is a safety degree region within the surrounding region of the vehicle after the collision that corresponds to a predetermined low safety degree, the predetermined low safety degree indicating a highest possibility that another object presents in the safety degree region corresponding to the predetermined low safety degree among the safety degree regions, and
in response to determining that there is the safety degree region within the surrounding region of the vehicle after the collision that corresponds to the predetermined low safety degree, execute the travel control of the vehicle to prevent the vehicle from entering into the safety degree region corresponding to the predetermined low safety degree.

18. The travel control apparatus for the vehicle according to claim 10, wherein the collision position on the vehicle where the object collides with is estimated based on the estimated travel route of the object.

* * * * *